United States Patent [19]

Carpenter

[11] 3,905,789
[45] Sept. 16, 1975

[54] EVAPORATOR COIL ASSEMBLY FITTING MOUNT

[75] Inventor: Charlie P. Carpenter, Elyria, Ohio

[73] Assignee: The Tappan Company, Mansfield, Ohio

[22] Filed: Mar. 20, 1974

[21] Appl. No.: 452,939

[52] U.S. Cl. .................. 62/299; 62/426; 62/515; 165/76; 285/161
[51] Int. Cl.² ........................................ F25D 19/00
[58] Field of Search ....... 62/298, 299, 77, 426, 515; 165/76; 403/22; 248/56; 285/161, 61, 64

[56] References Cited
UNITED STATES PATENTS

| | | | |
|---|---|---|---|
| 2,078,453 | 4/1937 | Miller | 248/56 |
| 2,236,130 | 3/1941 | Betebenner | 285/161 |
| 2,813,692 | 11/1957 | Bremer | 248/56 |
| 3,620,039 | 11/1971 | Williams | 62/298 |

Primary Examiner—William F. O'Dea
Assistant Examiner—Ronald C. Capossela
Attorney, Agent, or Firm—Donnelly, Maky, Renner & Otto

[57] ABSTRACT

An evaporator assembly mount for adaptor fittings on the liquid and suction lines of the coil comprising a mounting bracket secured to the assembly through which the fittings extend and an anchor plate releasably secured to the mounting bracket that has slots defining side edges which are received in grooves in the fittings thereby to secure such fittings to the assembly.

8 Claims, 6 Drawing Figures

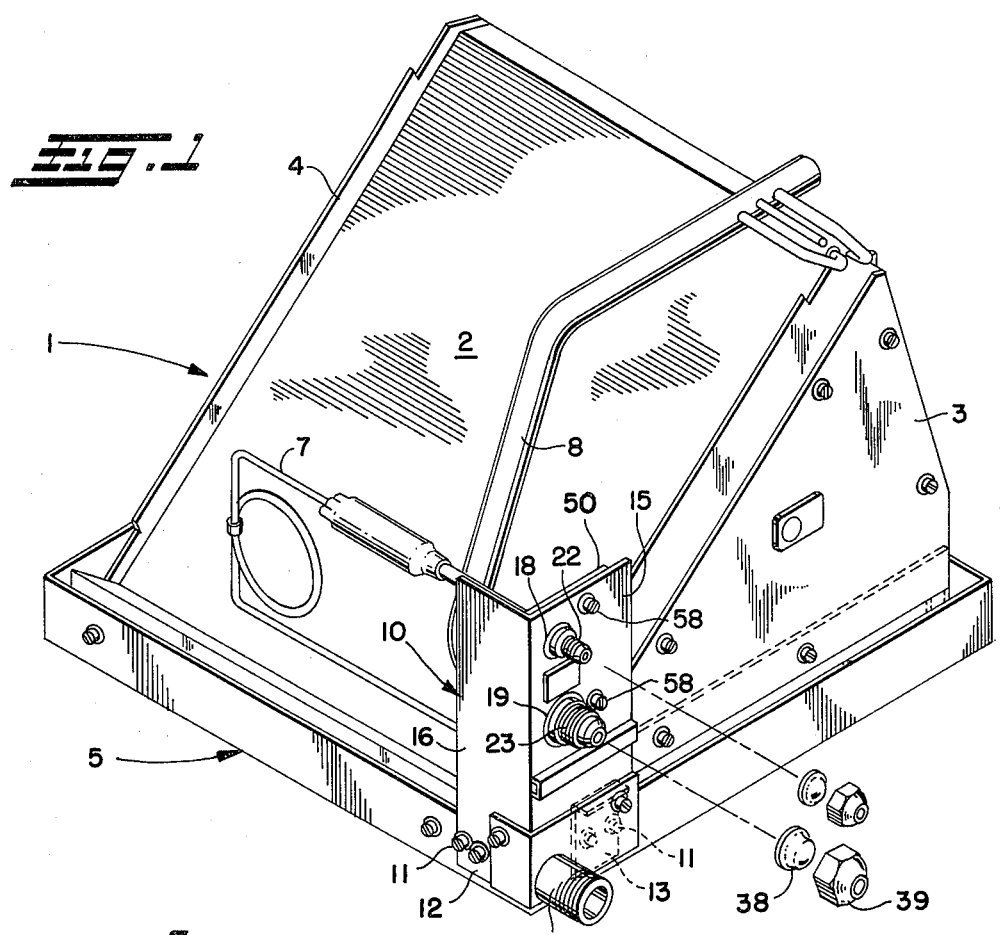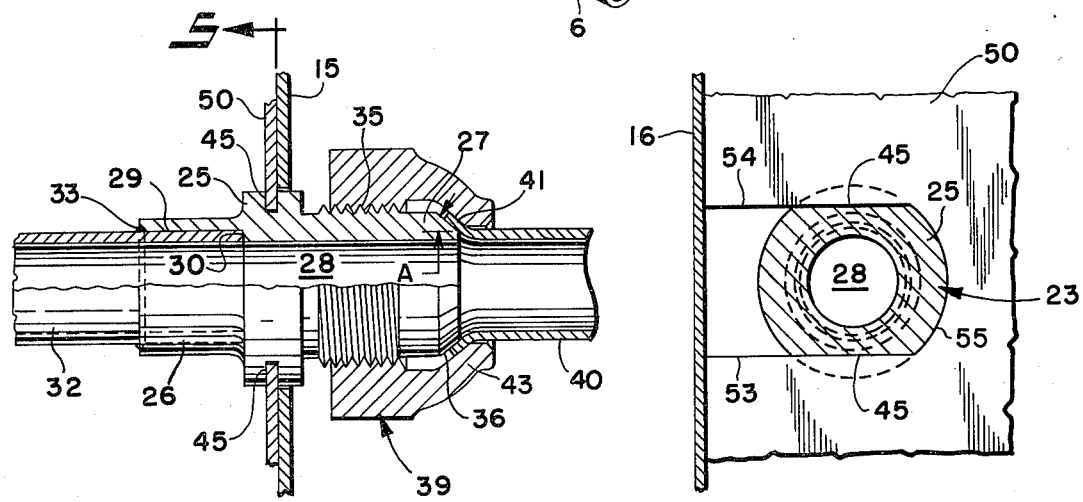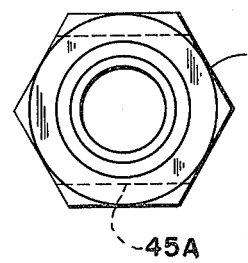

EVAPORATOR COIL ASSEMBLY FITTING MOUNT

BACKGROUND OF THE INVENTION

The present invention relates as indicated to an evaporator coil assembly in general and to an assembly mounting arrangement for the adaptor fittings and connected coil lines in particular.

An evaporator assembly for a residential central air conditioning system is normally manufactured and shipped as a separate component for field installation. Such assemblies have outwardly freely extending suction and liquid lines of the coil. The ends of such lines are normally brazed to an adaptor fitting generally having a central hexagonally configured body portion and a reduced diameter threaded end portion with a chamfered seating surface.

In field installation of the above described evaporator assembly, the installer places one wrench on the hexagonal body portion of the adaptor fitting and another wrench on the nut carried by the flared free end of the respective suction or liquid line of the air conditioning system. The nut is then screwed onto the threaded end of the adaptor fitting to draw the flared end of the line against the chamfered seat to complete the connection. The necessity of using two wrenches precludes the installer from holding and guiding the free end of the system line while effecting the coupling occasionally resulting in improper seating of the flared line on the chamfered seating surface of the adaptor. Such improper seating may result in cross threading and leakage at the fitting couple. Moreover, the torque applied to the outwardly freely extending coil lines tends to twist the same thereby possibly to cause constriction of the line diameter or weakening of the brazed connection between the evaporator line and the adaptor fitting.

In an attempt to eliminate the field assembly problems, applicant attached a mounting bracket to the base of the evaporator assembly, positioned a portion of the adaptor fitting in a bracket aperture, and brazed the fitting to the bracket. This structural modification essentially eliminated the above described field installation problems by requiring only one wrench to be used but did cause certain manufacturing problems.

More specifically, to avoid brazing fumes, cold rolled steel had to be used for the mounting bracket which discolored during the brazing operation. Such discoloration then had to be removed and the bracket painted. The brazing operation caused the bracket to warp resulting in misalignment of cooperative fastening apertures in the bracket and finally applied evaporator assembly housing. The bracket brazing operation also axially permanently stabilized the assembly lines thereby to result in reduction of rerouting flexibility during maintenance. Moreover, the heat generated by the brazing operation at times had a deleterious effect on the previously effected brazed coupling between the evaporator line and the adaptor fitting. Finally, the operation was relatively expensive and created potentially hazardous working conditions because of fumes and possible fire. Thus applicant developed yet another structural embodiment, which is the invention of the present application, to eliminate the field installation problems without creating the noted manufacturing problems caused by the first modification.

Accordingly, it is the primary object of the present invention to provide removable mounting structure for evaporator coil lines that permits dependable and relatively easy field installation and maintenance without unduly complicating the manufacturing process.

It is another object of the present invention to provide an evaporator assembly having spatially fixed lines for field installation that may selectively be freed for maintenance functions.

It is yet another object of the present invention to provide an anchor plate having slots therein which interfit with grooves in adaptor fittings on the coil lines. After implementing the interfit, the anchor plate may be releasably fastened to a mounting bracket on the assembly thereby axially and rotationally to stabilize the fittings and connected coil lines.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a perspective showing an evaporator assembly having the mounting structure of the present invention.

FIG. 4 is an elevation partially in section showing the suction line of the coil mounted to the evaporator assembly and installed in the air conditioning system.

FIG. 5 is a vertical cross section taken along line 5—5 of FIG. 4 showing the chordal grooves in the adaptor fitting.

FIG. 6 is an end elevation of another type of adaptor fitting used in the present invention.

DESCRIPTION OF THE PREFERRED EMBODIMENT

Figure 3:
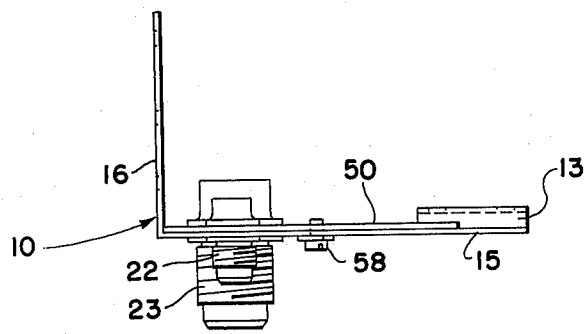
FIG. 3 is a top plan view taken along line 3—3 in FIG. 2.

Referring now in more detail to the drawings and initially to FIG. 1, an evaporator assembly indicated generally at 1 includes a coil 2 that is supported between side plates 3 and 4. Such side plates are connected along their lower edges to a drain pan assembly 5 operative to collect condensation dripping from the coil, such drain pan assembly being provided with an outlet tube 6 for removal of the condensation. The evaporator coil is provided with a liquid line 7 and suction line 8 that are releasably secured adjacent their ends to the evaporator assembly by the mounting structure of the present invention.

A L-shape mounting bracket indicated generally at 10 is secured to one corner of base assembly 5 by fasteners 11 passing through downwardly depending attachment tabs 12 and 13 on such bracket. Such L-shape mounting bracket provides a first leg 15 and a second leg 16, with the former being provided with two circular apertures 18 and 19 of different but preselected diameters. Adaptor fittings 22 and 23, brazed to the ends of the liquid and suction lines of the coil, are received in and partially extend through apertures 18 and 19, respectively. The adaptor fittings for any given unit are structurally identical except in size with such adaptors being dimensioned according to the diameters of the lines. It will thus be appreciated that the following detailed description of the suction line adaptor fitting likewise applies to the structure and function of the liquid line adaptor fitting.

Referring now to FIGS. 4 and 5, the adaptor fitting 23 for the suction line has a centrally positioned, generally cylindrical body portion 25, an axially extending evaporator line stub 26 and an oppositely directed, axially extending system line stub 27. A bore 28 extends through the adaptor fitting and is radially enlarged at 29 to form an annular internal shoulder 30. The evaporator line 32 of the coil is inserted in the radially enlarged end of bore 28 until the end of such line abuts shoulder 30. A brazed connection as indicated at 33 may then be made positively to secure the adaptor fitting to the suction or liquid line of the coil.

The system line stub 27 of the adaptor fitting is externally provided with threads 35 adjacent the central body portion 25. The end of the system stub is annularly tapered or chamfered at an angle of approximately 45° as shown by the reference letter A in FIG. 4 to provide a seat 36. During manufacture, the free ends of the adaptor fittings are normally capped to preclude dirt or other foreign matter from entering the lines during shipment. As shown in exploded form in FIG. 1, such capping is effected by a flare seal bonnet 38 being disposed in a flare coupling nut 39, with such nut being threaded onto stub 27 to draw the bonnet 38 into sealing contact with seat 36.

During installation, the coupling nut and bonnet and removed and the nut is then slid onto system line 40 and held there by flaring the end of the line as shown at 41. The installer then positions the flared end of the line against the seat 36 of stub 27 and threadingly draws nut 39 onto such stub thereby positively to force the collar or skirt 43 of the nut against the flared end of the line, which in turn is positively forced against seat 36 to form a tight liquid seal.

As shown in FIG. 5, the centrally positioned cylindrical body portion 25 of the fitting is provided with two diametrically opposed chordal grooves 45. The central body portion of the fitting may be hexagonal, as shown at 25A in FIG. 6, or of other geometrical configuration, but such differently shaped central body portion is likewise provided with diametrically opposed chordal grooves 45A.

To mount the suction and liquid lines to the evaporator assembly, a rectangular anchor plate 50 is provided that has two generally U-shape slots 51 and 52 in each of two opposed sides. Only two of the slots on one side of anchor plate 50 are in use at any one time, with the large slot 51 being for the suction line adaptor fitting and the smaller slot 52 being for the liquid line adaptor fitting. The two suction line slots 51 and the two evaporator line slots 52 are of slightly different widths for differently sized fittings and are diagonally opposed so that plate 50 may be rotated 180° and used in a different air conditioning system.

All of the slots have straight side edges 53, 54 and arcuate connecting bases 55. The width of each slot is selected to be equal to or just slightly greater than the distance between the bases of the chordal grooves in the adaptor fitting with which it is to cooperate. The radius for base 55 of the slot is selected substantially to equal the radius of the central body portion of such adaptor fitting.

Figure 2:
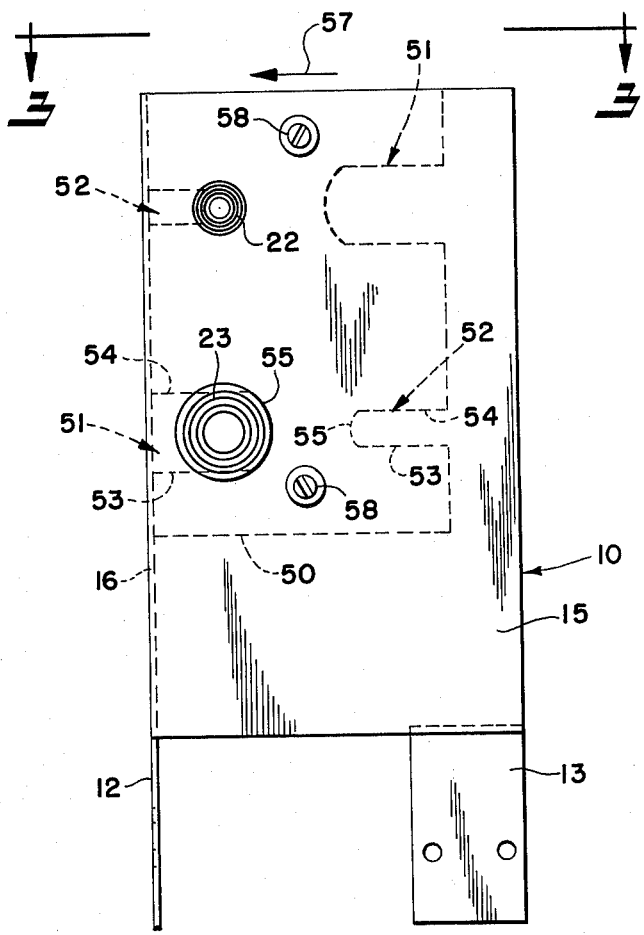
FIG. 2 is a side elevation of the mounting bracket showing the adaptor fittings and anchor plate in assembled condition.

In assembly, once the adaptor fittings are positioned in the apertures 18 and 19 in mounting bracket 10 so that the chordal grooves 45 are just behind or inside leg 15, the anchor plate 50 is laterally slide as indicated by arrow 57 in FIG. 2 until the side edges 53, 54 of the two slots 51, 52 are slidingly received in the chordal grooves 45 of the adaptor fittings. The anchor plate is laterally moved until the leading side edge of the same is in abutment with leg 16 of L-shape mounting bracket or other containment mechanism. In such position, the adaptor fittings 22, 23 are at the ends of the two U-shape slots 51, 52 with the arcuate connecting base of each such slot bearing against the outer surface of each cylindrical body portion, thereby to provide a frictional bearing surface to assist in holding such fitting. The anchor plate 50 is then secured to mounting bracket 10 by passing removable fasteners 58 through coaxially aligned apertures in such members.

In such finally mounted position, the adaptor fittings and thus evaporator lines are axially stabilized by the interfit between the slot sides and the chordal grooves in the body portion of the fitting. In addition, the connection of the anchor plate to the mounting bracket and the abutment between the side edge of the anchor plate and leg 16 of the mounting bracket or other containment mechanism act to resist rotational movement of such lines.

Thus prior to shipment from the factory, the anchor plate is installed as described above and the ends of the lines may then be capped by using one wrench. In the field, the lines are uncapped and the system connections made again with only one wrench being required with controlled torque.

If any problems occur during operation, maintenance can be simply performed by removing the anchor plate and mounting bracket by withdrawal of the respective fasteners. This provides axial freedom for the lines without breaking the fluid coupling so that rerouting or like maintenance may easily be performed.

The embodiments of the invention in which an exclusive property or privilege is claimed as defined as follows:

1. In combination with an evaporator assembly having an evaporator coil, a mount releasably to secure a liquid or suction line of the evaporator coil to the evaporator assembly comprising an adaptor fitting in such line having a body portion which is provided with at least one groove, a mounting bracket secured to the evaporator assembly having an aperture therein through which the body portion of the adaptor fitting extends, and an anchor plate having a slot defining side edges at least one of which may be slidingly received in the body groove, and fastening means selectively to secure said anchor plate to one side of said mounting bracket when said side edge of the slot of the anchor plate is received in said body groove to tightly secure such fitting and line to the assembly positively to preclude axial displacement and rotation of the same when said anchor plate is secured to said mounting bracket.

2. The mount of claim 1 wherein the mounting bracket is generally L-shape with the aperture being provided in one leg thereof, the anchor plate in secured position having the slotted edge in abutment with the other leg of the mounting bracket to assist in resisting torque forces applied to the line.

3. The mount of claim 1 wherein the adaptor fitting has a first end portion permanently connected to the coil line and has a second end portion threadingly receiving a nut on a flared end of the system line, said first and second end portions being at opposite ends of said body portion.

4. The mount of claim 1 wherein the mounting bracket is provided with two apertures and the anchor plate is provided with two slots whereby the liquid and suction lines of the evaporator coil may both be secured by the same mounting bracket and anchor plate.

5. The mount of claim 1 wherein the body portion of the adaptor fitting is generally hexagonal and has two opposed grooves therein.

6. The mount of claim 1 wherein the body portion of the adaptor fitting is generally cylindrical and has two opposed grooves therein.

7. The mount of claim 6 wherein the slot in the anchor plate is generally U-shape and has two straight sides which are received in said two grooves.

8. The mount of claim 7 wherein said U-shape slot is provided with an arcuate end which bears against the cylindrical body portion of the adaptor fitting when the latter is in mounted position.

* * * * *